(No Model.)
T. L. RANKIN.
ICE MACHINE.
No. 266,312.  Patented Oct. 24, 1882.
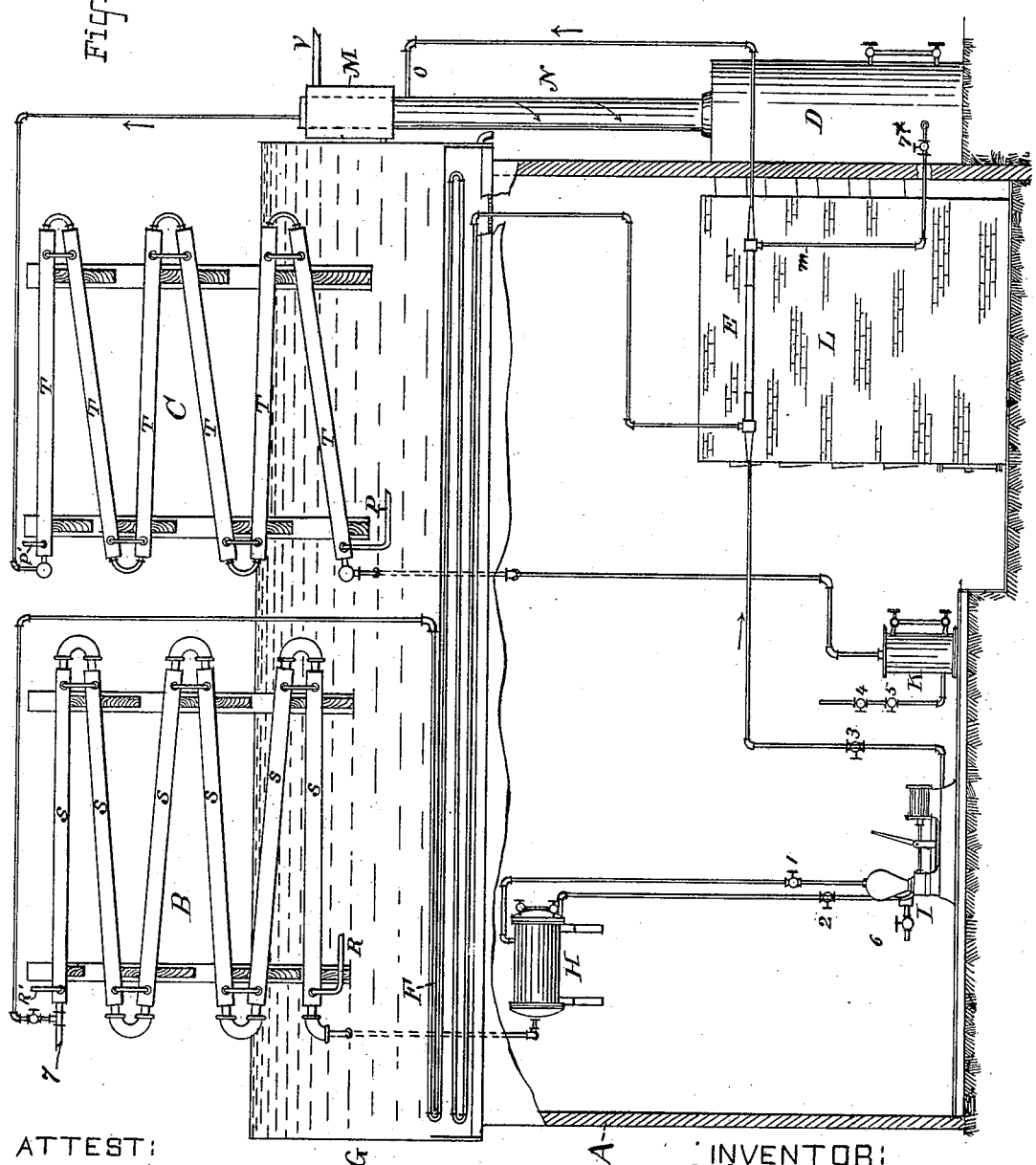
ATTEST:
Julian A. Hurdle.
W. C. McArthur.
INVENTOR:
Thos. L. Rankin.
per Wm. Alexander
Attorney.

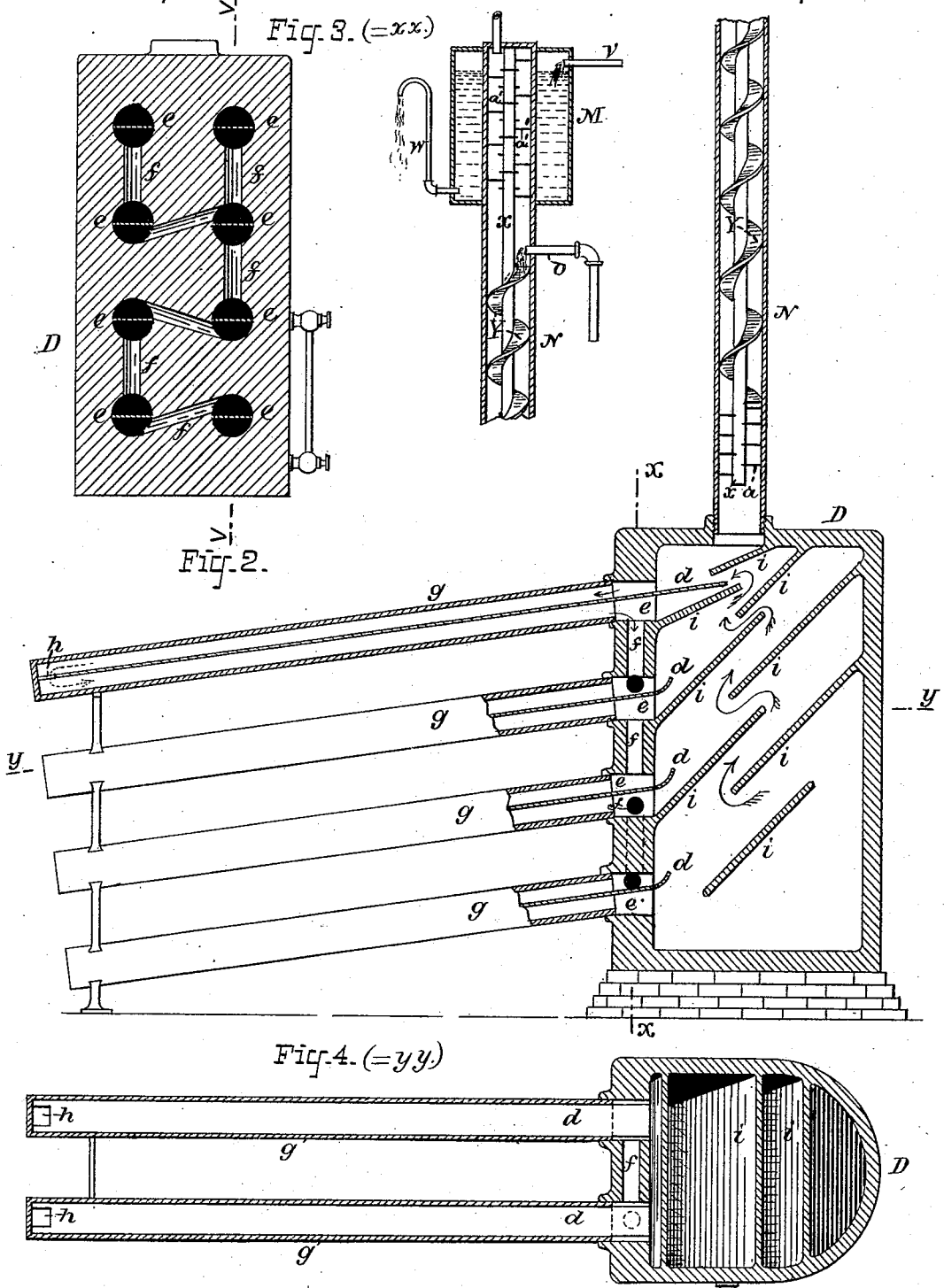

UNITED STATES PATENT OFFICE.

THOMAS L. RANKIN, OF NEW YORK, N. Y., ASSIGNOR TO THE RANKIN ICE MANUFACTURING COMPANY, OF SAME PLACE.

ICE-MACHINE.

SPECIFICATION forming part of Letters Patent No. 266,312, dated October 24, 1882.

Application filed February 25, 1882. (No model.)

*To all whom it may concern:*

Be it known that I, THOMAS L. RANKIN, of New York, in the State of New York, have invented certain new and useful Improvements in Ice-Machines; and I do hereby declare that the following is a full, clear, and exact description thereof, reference being had to the accompanying drawings, and to the letters of reference marked thereon, which forms part of this specification, in which—

Figure 1 is a sectional elevation of my improved apparatus for producing the freezing element, the apparatus for receiving the water to be frozen being omitted. Fig. 2 is a vertical sectional view of still L, header D thereof, and part of the stand-pipe N, which part, broken off, is represented on one side of this figure. Fig. 3 is a section taken vertically through the "header" in the plane indicated by the dotted line $xx$, Fig. 2. Fig. 4 is a section taken through Fig. 2 in the course of the dotted line $y\ y$.

Similar letters of reference indicate corresponding parts in the several figures.

My invention has reference to improvements in the manufacture of ice by the evaporation of fluid ammonia, wherein the ammonia is recondensed after it has been converted into a gas and reclaimed to be used over again.

The nature of the invention, which I shall hereinafter explain, consists in certain novel modes of constructing the condensing apparatus, and the header of the still, together with the means for preventing overflow into the chamber, of which the header forms an integral part, as will be hereinafter explained.

As this invention has especial reference to improvements in machinery for the production of ice, which have been patented to me, I shall confine myself to that part of my invention which is the subject of this application and claims.

L designates the still, of which D is the header or chamber of the still, the front wall of which is seven inches, more or less, in thickness, for the purpose of allowing for coring, as will be hereinafter shown. This thickened wall is well illustrated in Fig. 2, showing part of the coring; and it is also illustrated in Fig. 3, showing the coring when taken at right angles to the plane of the last-named figure.

In order to effect the division and conduction of the aqua ammonia from one of the still-pipes to another to effect the redistillation and transfer from pipe to pipe, I proceed as follows: The apparatus is charged by pumping aqua ammonia of proper strength into a pipe at 6, which is provided with a suitable valve, the valve 2 being shut. The ammonia is pumped, by means of the engine I, through the equalizer E to the stand-pipe at O. It thence runs down the spiral flange Y in the stand-pipe N, (shown clearly in Fig. 2,) where considerable evaporation takes place, and, leaving this spiral evaporator, the remaining aqua ammonia falls on the horizontal drip-plates $a$. Here a second evaporation takes place. From the last drip-plate in the series the aqua ammonia falls from the stand-pipe N upon the highest one of a number of inclined gates, which are lettered $i$, and arranged inside of the chamber D of the still. During this process of vaporization it will be observed that the gas passes through a pipe leading out of the top of the stand-pipe N, and communicating with the highest end of the top-inclined pipe of the condenser C. The fluid ammonia which falls on the highest gate, $i$, of the series of gates in the chamber D, flows into the top still-pipe, $g$, on the diaphragm, $e$, therein. Passing downward over this diaphragm the fluid escapes through an opening, $h$, at the lower end thereof, and passes backward and upward through pipe $g$, beneath the diphragm, to the coring $f$ in the cast-metal header, Figs. 2 and 3, down through which it passes to the next pipe below, thence crosswise, and so on until all of the pipes $g$ have been passed.

It will be seen by reference to Figs. 2 and 3 of the annexed drawings that the wall of the still-chamber D, into which the pipes $g$ are inserted tightly, is cast with vertical passages $f$, communicating with transverse passages $e$ and with inclined or oblique passages $f'$; also, that from this wall rises inclined gates, which interspace with other gates or plates descending from the opposite wall of the still-chamber D. During the passage of the ammoniacal liquor through the several still-pipes to the bottom of the still-chamber D the gas evolved will pass off freely from each pipe, escape through the stand-pipe and the pipe leading from its upper end, and enter the condenser C, as before stated. During this process of vaporization any water which may boil over with the outflowing gas from pipes g will be headed back into each pipe or section of pipes by the inclined gates i rising from the mouths of the transverse passages into which the pipes g are secured. These gates i, last referred to, effectually prevent any tendency to boil up into the condenser C and affect the gas by the water, which might by such ebullition be carried over. Such water is of course carried back into the respective pipes, and nothing but gas of ammonia is allowed to escape. The ascending gas is dried by the drip-plates a and the helical flange Y in the stand-pipe N by passing the descending aqua-ammonia in its passage down this stand-pipe. This gas, as before stated, passes into the condenser C, and is condensed by the still-pressure. The liquefied gas from the condenser accumulates in the receiver K, and is expanded through valves 4 and 5, for the purpose of refrigerating or making ice, as may be desired.

The refrigerating-chamber may be constructed in the usual well-known manner, and the pipes leading from this chamber (or chambers) communicate with a pipe, 7, leading to the absorber B. At this point the gas meets the weak aqua-ammonia, which is continually passing from the still-chamber through pipe m, cock $7^\times$, equalizer E, and cooling-coil F, which latter is cooled by water flowing through a tank in which it is situated. The gas is absorbed by the weak water of ammonia in its passage through B down to the receiver H, and from this receiver it is pumped by means of the engine I to keep up the supply of gas and water passing from the still. It will thus be seen that the process is continuous, and that there is little or no loss of ammonia.

To more effectually complete the drying of the ammoniacal gas in the upper part of the stand-pipe N before it escapes therefrom to the condenser C, I surround the upper portion of this stand-pipe with a jacket, M, (arranged above the inlet of pipe O,) through which water is caused to pass from pipe v to pipe w, and I arrange inside of that part of the stand-pipe which is thus surrounded and kept cool a series of segmental blades, $a'$, which, in a measure, retard the ascending gas and steam. The gas is thus deprived of moisture and the steam, which may ascend to these blades $a'$ is condensed, and the water of condensation carried back to the still-chamber D. If desired, water may be taken from the tank G, Fig. 1, for cooling the jacket M and upper part of the stand-pipe.

Having described my invention, I claim—

1. The combination, in an ice-making machine, of the still-cylinder D, having one side cored or chambered at $e f$, the still-pipes g, fitted into the said cylinder, the diaphragms arranged in the pipes g, and the inclined gates i, substantially as described.

2. In an ice-making machine, the combination of a stand-pipe provided with a winding evaporating-flange, drip-plates terminating at the lower end thereof, a still-chamber communicating with the pump I through an equalizer, inclined gates or plates arranged in the still-chamber, the chambered wall thereof, the still-tubes and diaphragms arranged therein, substantially as described.

3. The still-chamber having inclined plates, inclined tubes, diaphragms arranged in the tubes, passages h, a perforated wall having passages leading from one tube, g, to another, a communication leading to the pump I, a stand-pipe also communicating with said pump and with a condenser, C, a pipe leading from the condenser to a liquid ammoniacal gas-receiver K, and a draw-off pipe provided with cocks, substantially as described.

4. The combination of the still-chamber D, its inclined plates, chambered wall, inclined still-pipes, and perforated diaphragms therein, with the pipes leading into and out of this still-chamber, the condenser C, the receiver K, the cooling-coil F, the absorber B, the receiver H, and the pump I, all operating together for the purpose and in the manner specified.

5. The combination of the still-chamber D, the stand-pipe, the winding flange Y, the plates $a'$ above this flange, and the water-jacket M arranged above the inlet of pipe O, substantially as described.

In testimony that I claim the foregoing as my own I affix my signature in presence of two witnesses.

THOS. L. RANKIN.

Witnesses:
JOHN H. STITT,
C. S. PHILLIPS.